2,060,155

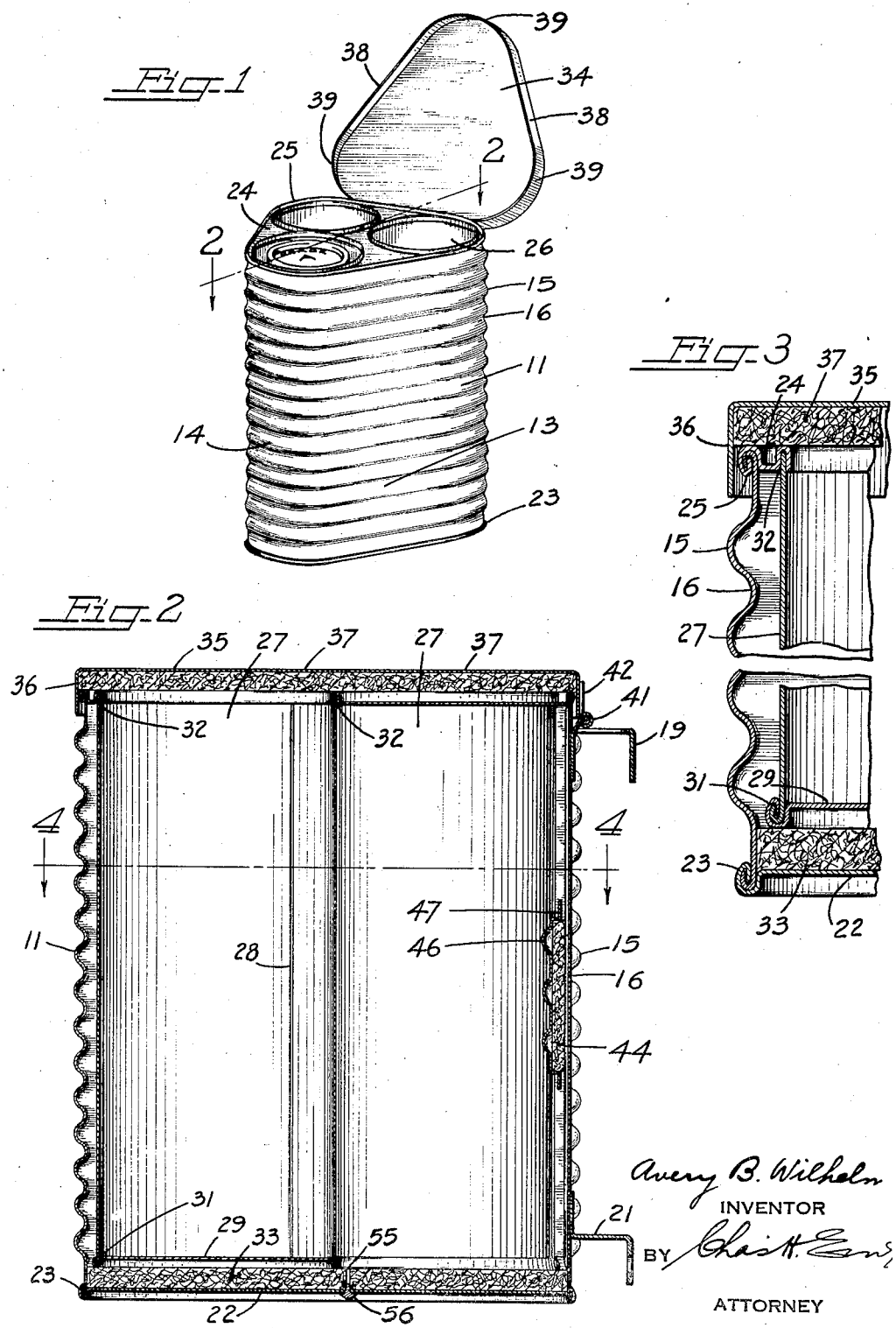
Nov. 10, 1936. A. B. WILHELM 2,060,155
INSULATED CONTAINER
Filed Nov. 29, 1932 2 Sheets-Sheet 1
Avery B. Wilhelm
INVENTOR Nov. 10, 1936.                A. B. WILHELM                2,060,155
                            INSULATED CONTAINER
                           Filed Nov. 29, 1932           2 Sheets-Sheet 2
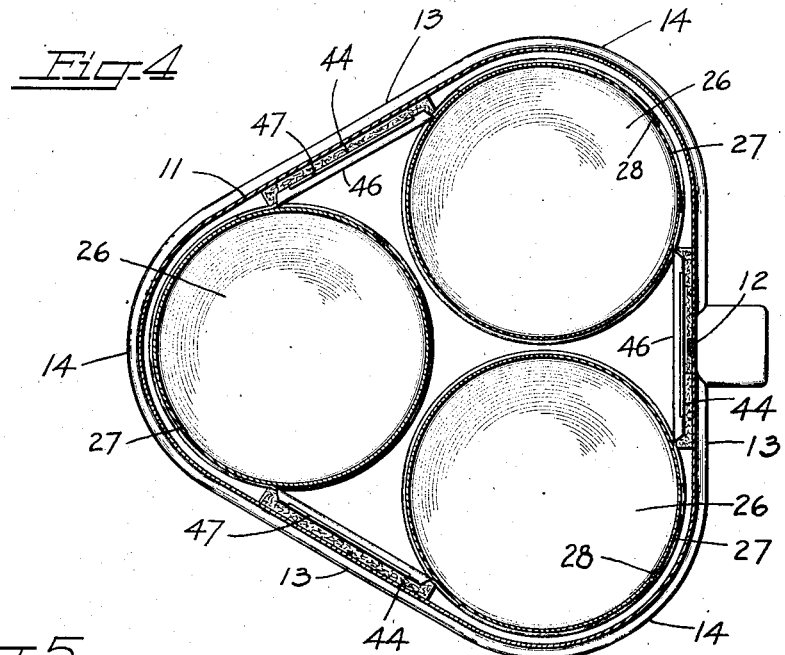
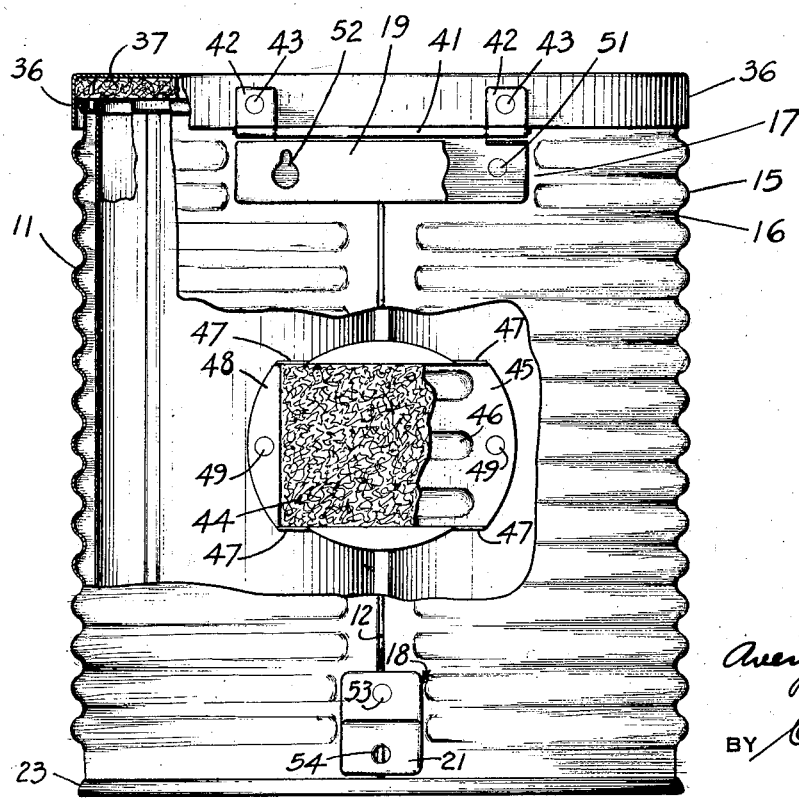
Avery B. Wilhelm
INVENTOR
BY
ATTORNEY Patented Nov. 10, 1936

UNITED STATES PATENT OFFICE 2,060,155

INSULATED CONTAINER

Avery B. Wilhelm, Miami, Fla., assignor to John N. Ledbetter, 3d, New York, N. Y.

Application November 29, 1932, Serial No. 644,807

5 Claims. (Cl. 220—16)

This invention relates in general to insulated containers or holders and more particularly to double walled, vacuumized containers for holding therein, and substantially preserving the temperature of, filled food containers or the like.

A principal object of the present invention is to provide an insulated, double walled, receptacle having a plurality of compartments adapted to hold a plurality of filled food containers, such as milk bottles, fruit and tomato juice receptacles, cheese containers, and the like, and which will protect such food containers against changes in temperature and also against dust, dirt and other undesirable contaminations.

An important object of the invention is the provision of such a double walled compartment container of comparatively light gauge sheet material which is adapted to be readily insulated against changes in temperature by drawing a vacuum within the space provided by the double walls and in which shape and reinforced construction cooperate to provide adequate resistance to outside atmospheric pressure when the container is vacuumized.

Another important object of the invention is the provision of a thermal container of comparatively light gauge sheet material of such cross sectional configuration, reinforced wall and corner, and hermetic seam construction, all designed to cooperatively withstand substantial atmospheric pressure attendant upon the drawing of a relatively high vacuum and calculated to hold such vacuum substantially permanently.

Another important object of the invention is the provision in a multiple pocket insulated container of reinforcing means located between the pockets and the outer encompassing wall.

Another important object of the invention is the provision in such an insulated container of cushioning means located between the encompassing walls of the outer container and the walls of the pockets or compartments, which cushioning means are adapted to absorb any shock from within or without the container.

Still another purpose of the invention is to provide a resilient cover for such a compartment container to substantially seal the compartments against the atmosphere.

Still another important object of the present invention is to provide such a container which is of simple and inexpensive construction, which will occupy a minimum of space while providing a maximum of holding capacity and which in its entirety presents an attractive and compact appearance.

Another purpose of the invention is to provide a thermal holder which is portable, which has provision for ready attachment to walls, posts or other suitable supports in and about a building and which, because of its shape, lends itself to an economical and symmetrical distribution of pockets or compartments.

Numerous other objects and advantages of the invention will be apparent as it is better understood from the following description, which, taken in connection with the accompanying drawings, discloses a preferred embodiment thereof.

In the drawings:

Figure 1 is a perspective view of the container embodying the present invention, showing the hinged container lid in raised position;

Fig. 2 is an elevational cross section of the container, taken along lines 2—2 of Fig. 1, with the contained milk bottle omitted;

Fig. 3 is an enlarged, fragmental, sectional view showing top and bottom constructions of the container and its compartments;

Fig. 4 is a horizontal, cross sectional view of the container taken along lines 4—4 of Fig. 2; and Fig. 5 is an elevational view of the rear of the container, with parts broken away to show details of construction.

Referring now in more detail to the drawings:

The preferred embodiment of the invention illustrated in the drawings (see Fig. 1), comprises a relatively tall sheet metal container of heart or triangular shape in cross section, with three compartments and adapted to hold three quart size milk bottles. One of these bottles is shown positioned in one of the compartments. Reactions from the trade indicate this to be the most practical and popular size container.

The container comprises a tubular outer body 11, made from a rectangular blank of comparatively light gauge sheet material which is bent to heart or triangular cross sectional shape (see Fig. 4). The vertical edges of the blank are joined together in an internal lock seam 12, preferably located along the vertical center line of the rear wall. Thus shaped, the body 11 has three walls 13 which merge into three gradually curved, rounded or circular corners 14.

The blank from which the body is formed is corrugated or ribbed in the flat to provide horizontal series or rows of rounded ridges 15 and troughs 16 which stiffen and strengthen the body 11 about substantially its whole area. These ridges and troughs extending horizontally around the sides and corners of the body, stop short a short distance from either side of the lock seam 12, where the blank is left smooth and flat to facilitate the formation of the lock seam 12 (see Fig. 5).

The two upper pairs of ridges and troughs and the two lower pairs terminate short of the terminal points of the remaining ridges and troughs to leave flat rectangular spaces 17 and 18 disposed centrally of the side seam 12, where container supporting brackets 19 and 21 may be secured.

The bottom of the body 11 is hermetically sealed by means of a bottom end 22 secured to the body by a double seamed and/or soldered joint 23. The top edge of the body 11 is hermetically sealed to a top end or web member 24 by a double seamed and/or soldered joint 25. The web member 24 is of the same peripheral shape and dimension as the bottom end 22, and is provided with three circular openings to receive tubular pocket or compartment members 26, as will be presently described.

Three cylindrically shaped inner compartments or pockets 26 are arranged symmetrically within the outer body 11, one in each rounded corner 14. Each of these compartments is preferably of a height and diameter to permit the snug positioning therein of a standard quart size milk bottle or a quart size fruit or tomato juice container or any other food container of quart size or smaller. It is understood, of course, that the outer body 11 and the inner compartments 26 may be made of any desired dimensions and relatively proportioned to accommodate any desired size of container.

Each compartment comprises a cylindrical body 27 having a vertical side seam 28, with the projecting locked portions of the seam exterior of the body cylinder, i. e. facing the inner surface of the corrugated outer body 11. This arrangement of the side seam leaves the inner surface of the body 27 smooth and continuous, except for the usual small groove created by such a seam.

The bottom of each body 27 is hermetically sealed by a bottom end 29 secured to the body by a double seamed and/or soldered joint 31. The bodies 27 (Fig. 4) are spaced away from the corrugated outer body 11 and from each other a sufficient distance to surround them with an adequate insulation space from which the air may be substantially entirely removed.

In order to seal this space from the atmosphere at the top, the top end or web member 24 has its circular marginal parts, which surround the three openings left by the cut away portions, bent upwardly, then across, then downwardly, embracing the top edges of the bodies 27 to form with them crimped and/or soldered hermetic joints 32. (See Fig. 3.)

It will be seen, by reference to Figs. 2 and 3, that the bodies 27 are of less height than the height of the body 11 and that the bottoms 29 do not touch the bottom 22, but a space is left between these bottoms. This space is substantially filled by a fibrous board or pad or packing 33 of any suitable resilient material, such as rubber, cork, asbestos, "Celotex," etc., etc. The pad 33 has a configuration corresponding to the shape of the bottom 22 and is thick enough to snugly engage or press against the double seams 31 of the bodies 27, so that the latter are directly supported by the pad and a cushioning effect is provided when a relatively heavy filled container, such as a quart milk bottle, is dropped into a compartment. Also, the pad 33 helps to prevent inward collapse of the bottom 22 when a relatively high vacuum is drawn in the insulation space.

To close the open tops of the compartments 26, a hinged lid 34 is provided. This lid comprises a heart or triangular shaped flat panel 35, a depending flange 36 and a fibrous liner or pad 37, preferably of the same material as the pad 33. The depending flange 36 has three sides 38 corresponding to the sides 13 of the body 11 and three rounded corners 39 corresponding to the corners 14 of the body 11 and is so dimensioned that when the lid is in closed position, as shown in Fig. 2, the flange 36 closely surrounds the double seam 25, or it may be made to tightly hug the seam 25.

The lid 34 is hingedly connected to the rear wall of the body 11 by a pintle hinge 41. This hinge has a pair of outer hinge leaves 42 spot welded to the rear side of the lid flange 36, as at 43, the center leaf being integral with the bracket 19 hereinafter more fully described.

When the lid 34 is in closed position (see Fig. 3) the pad or packing 37 engages the joints 25 and 32, which terminate upwardly on an even plane, and the compartments 26 are thus substantially shut off from the atmosphere. If desired, a clamping device, (not shown) for example a hasp and staple, might be applied respectively to the front corners of the lid and container to tightly clamp the lid down upon the container. However, the weight of the lid has proved to be sufficient to substantially shut off the compartments 26 from the atmosphere.

To further strengthen the comparatively extensive side walls 13 against inward flexing or collapse when a very high vacuum is drawn in the insulation space or when particularly light gauge sheet metal is used in the manufacture of the container, a rectangular piece of board or pad 44, preferably of the same material as the pads 33 and 37, is interposed between each side wall 13, and the cylindrical walls of two adjacent compartments 26 (see Figs. 4 and 5). The pad 44 is supported and held in proper position by a sheet metal clip or bracket 45, which preferably has a corrugated wall 46 facing inwardly, bottom and top flanges 47 bent outwardly to grip and hold the bottom and top edges of the pad 44, and side flanges 48 spot welded at 49, or otherwise suitably secured, to the outer surfaces of the cylindrical walls of two adjacent bodies 27. These pads and brackets may be dispensed with when the vacuum drawn in the insulation space does not exceed 20 inches. The danger of collapse of the side walls, of course, varies with the size of the container, with the strength of tin plate employed, and with the degree of vacuum drawn.

It has been found that cylindrical containers, when vacuumized, withstand atmospheric pressure best. However, they are not suited for an economical and symmetrical division of their inner space. Square and rectangular containers are better adapted for economical distribution of space, but their side walls readily collapse by outside pressure even when only a low vacuum is drawn. The container of the present invention combines the advantages of these types without the disadvantages of any of them. Its heart or triangular cross sectional shape permits of economical distribution of the compartments 26, one in each rounded corner, and its side walls 13 are strengthened by gradually merging into rounded corners 14 which possess the pressure resisting strength of a cylindrical container.

When it is intended to fasten or hang the container on the wall or post of the kitchen or porch or some other suitable place, this may be accomplished by providing the container with supporting brackets 19 and 21 previously referred to.

The top bracket 19 is of inverted U-shape, the inner leg of the U being spot welded at opposite ends 51 to the rear wall 13 of the body 11. This inner leg also functions as the center hinge leaf of the hinge 41. The outer leg of the U is provided with two oppositely disposed perforations 52, adapted to receive the heads of supporting nails or screws. The web portion connecting the two legs is cut away and this cut away portion serves as the center pintle sleeve of the hinge 41.

The companion bottom bracket 21 comprises a double angled piece having two vertical members bent in opposite directions at right angles to a connecting horizontal member. The upper vertical member is spot welded at 53 to the flat part 18 of the rear wall 13 and the lower vertical member is provided with a hole 54 to receive a supporting pin, nail or screw.

When the space between the outer body 11 and the compartments 26 is to be vacuumized, a small opening is punctured in the bottom 22, preferably at the point 55, and a vacuum of 18" or more is drawn in the space through the hole 55 while the container is in a vacuum chamber having therein a soldering device. As soon as the desired degree of vacuum has been reached the small hole 55 is quickly sealed by a drop of solder 56.

While a vacuum is undoubtedly the best known insulator against change in temperature and will preserve the temperature of food products for the longest period, the usefulness of the receptacle of the present invention as a food preserver does not wholly depend upon a vacuum being drawn therein. It is conceivable that the space between the outer body and the inner compartments might be kept as a dead air space or might be filled with a fibrous insulating material like that of the pads 33 and 37. It would then still function, but to a lesser degree, as an insulated receptacle.

While in the preferred embodiment disclosed solder has been specified as a hermetic sealing medium any suitable sealing compound may be used to seal the joints or seams and any suitable joint or seam construction may be employed.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. An insulated receptacle for holding and preserving food products, comprising in combination, an outer tubular body of comparatively light gauge sheet material and of substantially triangular shape in cross section and having three substantially straight sides joined by three gradually rounded corners, and three cylindrical inner compartments spaced from said body and hermetically joined to said body by a web member, the spaces between said compartments and said body being sealed against the atmosphere, whereby a vacuum may be created in said spaces, the arrangement of said sides and corners cooperating to provide resistance against atmospheric pressure to prevent collapse when a substantial vacuum is created in said spaces.

2. An insulated receptacle for holding and preserving food products, comprising in combination, an outer tubular body of comparatively light gauge sheet material and of substantially triangular shape in cross section and having three substantially straight sides joined by three gradually rounded corners, a cylindrical inner compartment arranged in each of said corners, said compartments being spaced from each other and from said body to provide insulating spaces, and being joined to each other and to said body by a web member in hermetic seams, said insulating spaces being adapted to be vacuumized, the arrangement of said sides and said corners cooperating to provide resistance against atmospheric pressure to prevent collapse when a substantial vacuum is created in said spaces.

3. An insulated receptacle for holding and preserving food products, comprising in combination, an outer tubular body of comparatively light gauge sheet material and of substantially triangular shape in cross section and having three substantially straight sides joined by three gradually rounded corners, and three cylindrical inner compartments spaced inwardly of said body and arranged one in each of said corners and hermetically joined to said body by a web member, the spaces between said compartments and said body being sealed against the atmosphere, whereby a vacuum may be created in said spaces, the said sides and corners being reenforced by corrugations, the arrangement of said sides and corners and corrugations cooperating to provide resistance against atmospheric pressure to prevent collapse when a substantial vacuum is created in said spaces.

4. An insulated receptacle for holding and preserving food products, comprising in combination, an outer tubular body of comparatively light gauge sheet material and of substantially triangular shape in cross section and having a hermetically sealed bottom and three substantially straight sides joined by three gradually rounded corners, and three cylindrical inner compartments arranged inwardly of said body and spaced from said sides and from the bottom of said body and hermetically joined to said body by a web member, the spaces between said compartments and said body being sealed against the atmosphere, whereby a vacuum may be created in said spaces, and resilient pads arranged between said sides and said compartments and said bottom and said compartments, the arrangement of said sides and corners cooperating to provide resistance against atmospheric pressure to prevent collapse when a substantial vacuum is created in said spaces.

5. An insulated receptacle for holding and preserving food products, comprising in combination, an outer body of comparatively light gauge sheet metal having substantially straight sides joined by gradually rounded corners, and a plurality of compartments within and hermetically sealed with said body to provide an insulating space, said compartments being equally distributed within said body with one compartment located within each of said corners, the metal of said sides being corrugated, said sides, corners and corrugations cooperating to reenforce said receptacle.

AVERY B. WILHELM.